United States Patent [19]

Grogan

[11] Patent Number: 4,840,339
[45] Date of Patent: Jun. 20, 1989

[54] BISTABLE PANEL ATTACHMENT SYSTEM

[75] Inventor: Larry N. Grogan, Manchester, N.H.

[73] Assignee: Velcro Industries B.V., Amsterdam, Netherlands

[21] Appl. No.: 148,932

[22] Filed: Jan. 27, 1988

[51] Int. Cl.$^4$ .............................................. A47G 29/00
[52] U.S. Cl. .......................... 248/205.2; 52/DIG. 13; 52/222; 52/203
[58] Field of Search ............. 248/205.2; 52/DIG. 13, 52/222, 203, 397, 398; 24/442, 447

[56] References Cited

U.S. PATENT DOCUMENTS

| | | | |
|---|---|---|---|
| 2,826,788 | 3/1958 | Graham | 52/222 X |
| 2,916,324 | 12/1959 | Graham | 52/222 X |
| 3,390,495 | 7/1968 | Dalby | 52/222 |
| 3,654,740 | 4/1972 | Morton | 52/222 |
| 3,657,850 | 4/1972 | Billarant | 52/222 |
| 4,055,030 | 10/1977 | Eamshaw | 52/222 X |
| 4,083,153 | 4/1978 | Sumpter | 52/222 X |
| 4,562,675 | 1/1986 | Baigas, Jr. et al. | 52/203 |

FOREIGN PATENT DOCUMENTS

| | | | |
|---|---|---|---|
| 2313694 | 3/1974 | Fed. Rep. of Germany | 52/222 |
| 2241204 | 3/1975 | France | 52/222 |
| 874934 | 10/1981 | U.S.S.R. | 52/222 |

Primary Examiner—Alvin C. Chin-Shue
Attorney, Agent, or Firm—Hayes, Soloway, Hennessey & Hage

[57] ABSTRACT

A touch fastener component for flush-mounting a structure to a support comprising a resilient member having one portion of a touch fastener material attached to a surface thereof adjacent a center portion thereof, a restraining device defining the length of a chord of the curvature of the member to form a curved resilient spring able to move from a first of two stable positions to a second of the two stable positions, and an adjusting device for adjusting the chord length of the member. The elements of one portion of the touch fastener, when engaged with the elements of the other touch fastener, resiliently fasten the structure and the support together by a force provided by the engagement of the elements of the touch fasteners and the resilience of the resilient member.

16 Claims, 5 Drawing Sheets

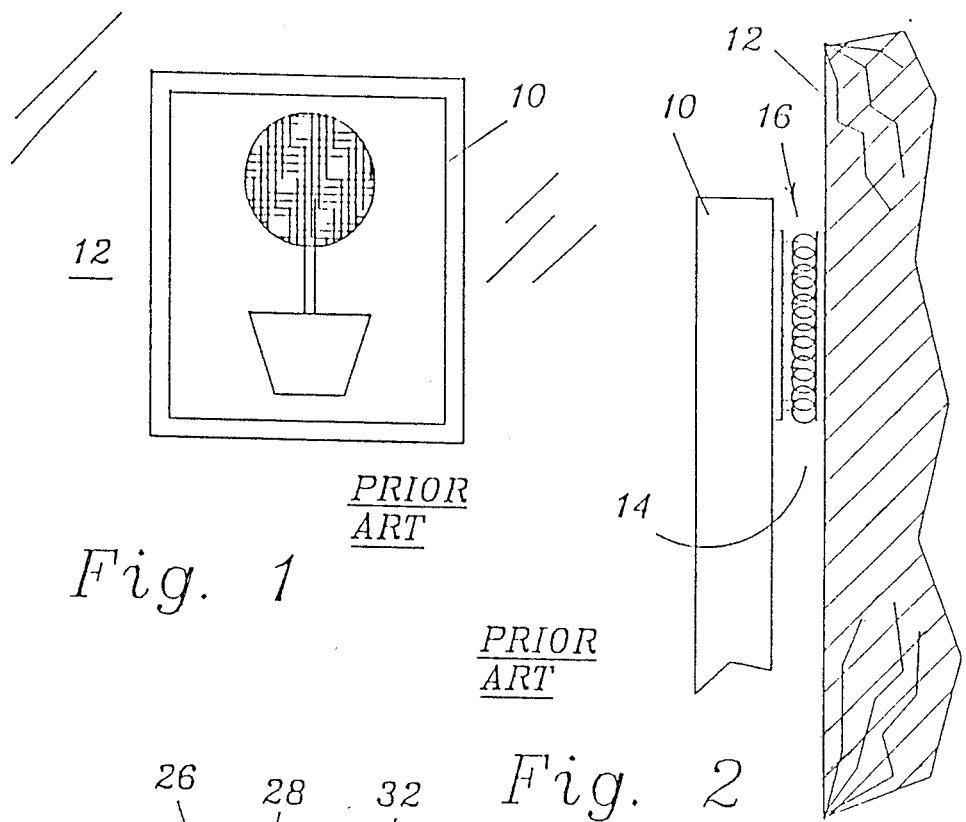
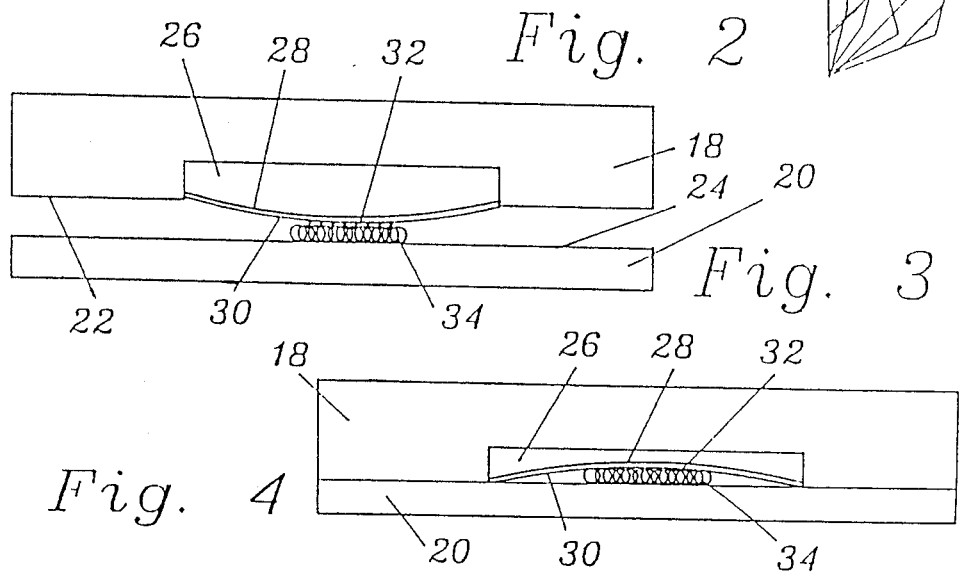

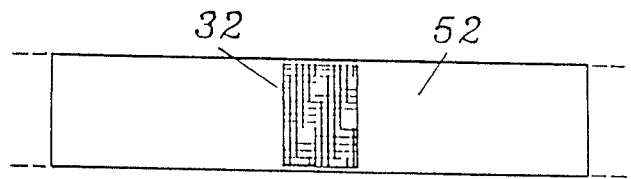
Fig. 5
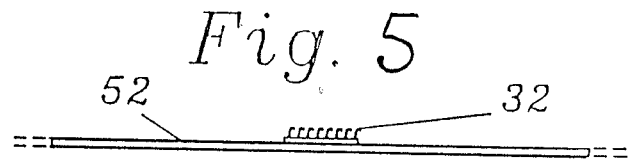
Fig. 6
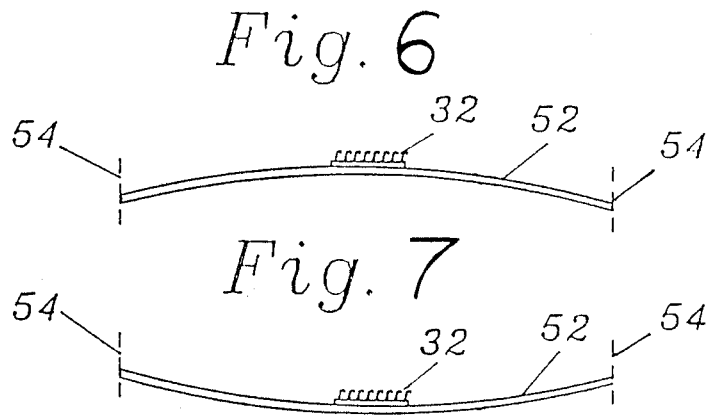
Fig. 7
Fig. 8
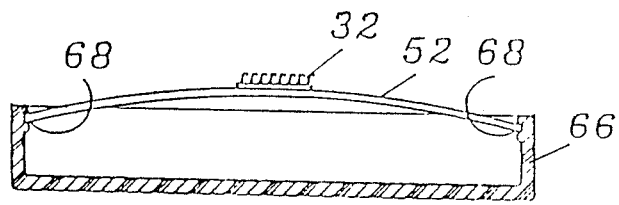
Fig. 9

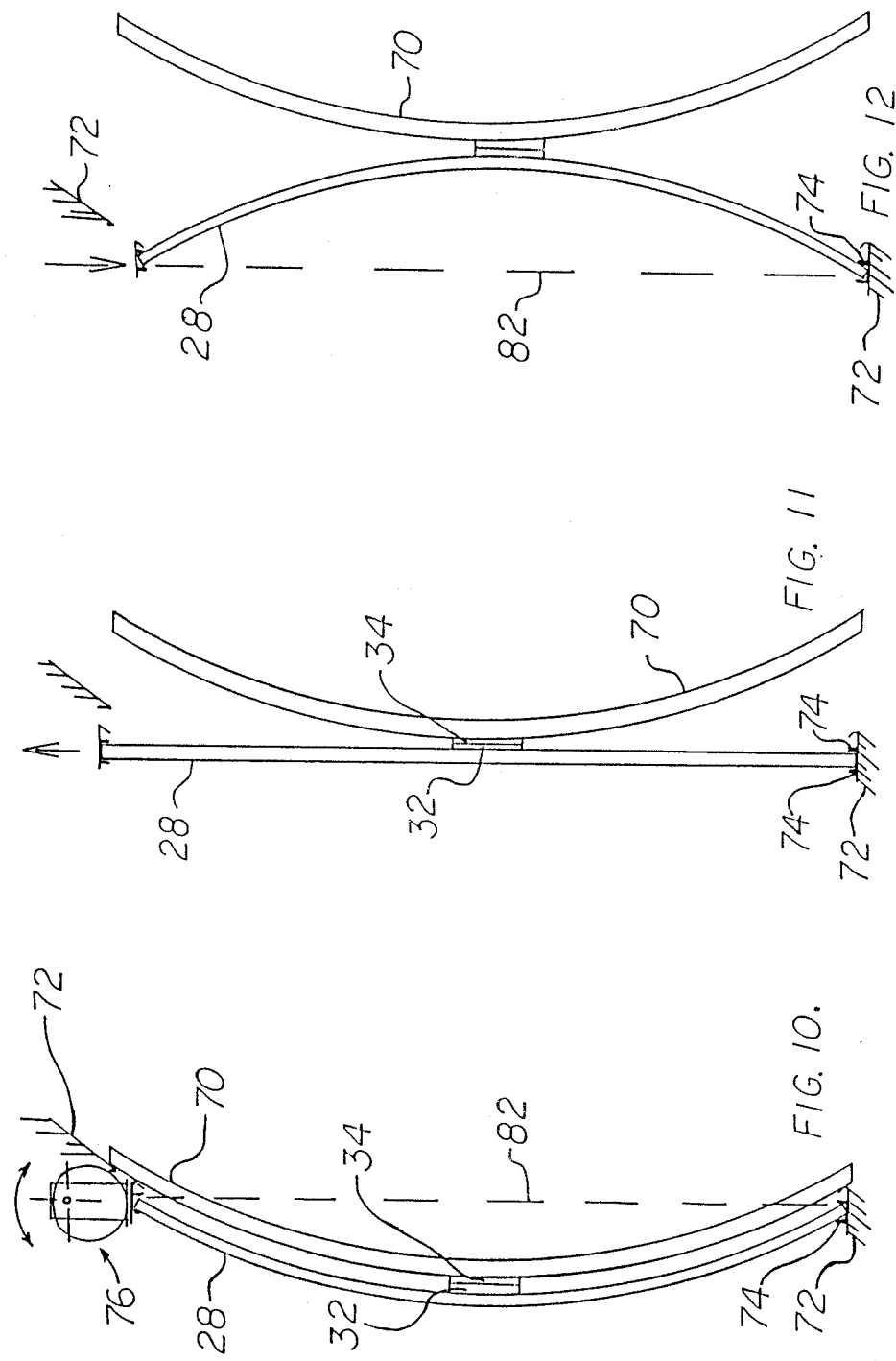

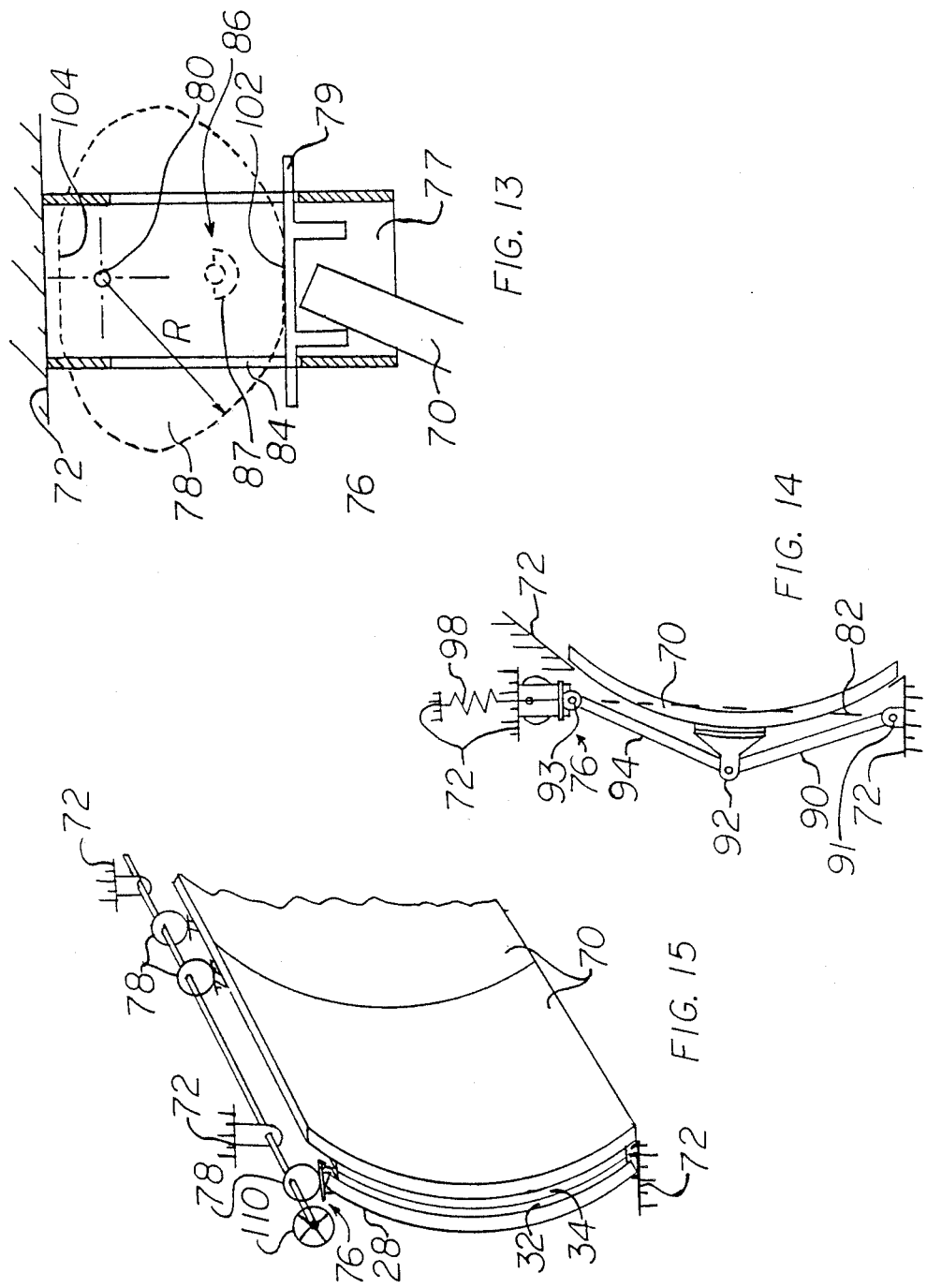

BISTABLE PANEL ATTACHMENT SYSTEM

Copending U.S. application Ser. No. 002,032, filed on Jan. 12, 1987, relates to "pop" through touch fasteners for flush mounting a component to a surface by way of a fixed chord length resilient member.

The present invention relates to a fastening system and, more particularly, to a touch fastening system for mounting a structure to a support comprising a planar, resiliently flexible member having one portion of touch fastener material attached to a surface thereof, adjacent at least a center portion thereof, and means for restraining the resiliently flexible member in a curved first stable position. The restraining means is adjustable so that the chord length of the curved member can be increased to allow that member to move between the first stable position in which the structure is firmly mounted to the support, and a second stable position in which the structure is spaced from the support.

BACKGROUND OF THE INVENTION

The present invention has to do with fastening systems, especially touch fastener systems. A touch fastener, as the term is used herein, comprises a first portion in the form of a planar backing material or part having a surface carrying hooks, mushrooms, balls on stems, pigtails, or the like, capable of engaging loops, hooks, mushrooms, balls on stems, pigtails, or the like, carried by a second planar backing material or part, forming a second portion, to fasten components together. By way of example only, touch fasteners include hook and loop type separable fasteners such as that sold under the trademark VELCRO are shown and described in the drawings and descriptions contained hereinafter.

Touch fastener materials have enjoyed great popularity and new uses therefor are constantly being realized. In use, one portion is attached to one surface to be joined and the other portion is attached to another surface to be joined. To join the two surfaces, the two touch fastener portions are merely pressed together. In some instances, the two touch fastener portions can be easily pulled apart while in other applications the fasteners are essentially permanently joined due to the type of touch fastener employed, e.g. the mushroom heads. The joining force is quite substantial, particularly in the "shear" direction while even major misalignment is accommodated.

FIG. 1 illustrates one common use for touch fastener materials, i.e. attaching a picture 10, or the like, to a surface such as a wall 12. As shown in the side view of FIG. 2, the prior art approach results in a gap 14 between the back surface of the picture 10 and the wall 12 caused by the thickness of the adhesive backing and active portions of the touch fastener materials generally indicated as 16. In many instances, the small gap 14 is quite acceptable. In others, both the gap and the ability of viewing the touch fastener materials 16 therethrough are aesthetically unpleasing. One principal example is the use of touch fastener materials to attach a speaker grill to the speaker enclosure. Where the design does not include a surrounding outer framework containing the grill therein so as to hide any gap, absolute flush mounting is required of the mounting system employed.

Wherefore, it is the object of the present invention to provide a mounting system for use with touch fasteners which will provide for firmly and securely mounting a structure to a support while providing for ready and easy movement of that structure to a second position spaced from the support.

SUMMARY OF THE INVENTION

The foregoing object has been achieved by the touch fastener component of the present invention for flush-mounting a structure to a support comprising a resilient member having one of the first and second parts of the fastener attached to a surface thereof at least adjacent a center portion thereof; restraining means defining the length of a chord of the curvature of said member to form a curved resilient spring able to move from a first of two stable positions to a second of the two stable positions, the elements of said first part, when engaged with the elements of said second part, resiliently fasten said structure and support together by means of a force provided by the engagement of the elements of the fastener parts and the resilience of the resilient member; adjusting means associated with said restraining means for adjusting the chord length of said curved resilient member when desired to facilitate movement of said member from one to the other of said two stable positions.

In one embodiment, the resilient member is a unitary structure held in the curved bi-stable positions by the adjustable restraining means, the restraining means being adjustable to vary the chord length to adjust the ease of movement between the two stable positions.

In another embodiment, the resilient member comprises at least two mechanical members linked together to form a bi-stable mechanical member. The bi-stable mechanical member can further include spring means for biasing the mechanical members to lie in a plane when unrestrained.

BRIEF DESCRIPTION OF THE DRAWINGS

The invention will now be described, by way of example, with reference to the accompanying drawings, in which:

FIG. 1 is a drawing showing a prior art environment using a touch fastener;

FIG. 2 is a side view of the upper portion of FIG. 1 showing the prior art manner of using touch fasteners to attach a panel, or the like, to a surface;

FIG. 3 is a simplified drawing showing a bi-stable member in one of its two stable positions;

FIG. 4 is a simplified drawing showing the bi-stable member in the other of its two stable positions;

FIG. 5 is a plan view of a bi-stable member in its simplest embodiment when configured as a rectangular strip;

FIG. 6 is a side view of FIG. 5;

FIGS. 7 and 8 are side views of FIGS. 5 and 6 illustrating how foreshortening the strip results in the required bi-stable condition thereof;

FIG. 9 is a cutaway side view of a cup-shaped holding means for use in conjunction with the strip embodiment of FIGS. 5-8;

FIG. 10 is a diagrammatic representation showing the resilient member of the present invention in its first stable position for attaching a panel to a frame;

FIG. 11 is a diagrammatic representation similar to FIG. 10 showing the resilient member of the present invention in its unrestrained position;

FIG. 12 is a diagrammatic representation similar to FIG. 10 showing the resilient member of the present invention in its second stable position with the panel spaced from the frame;

FIG. 13 is an illustration in greater detail, of the cam device shown in FIG. 10;

FIG. 14 is a diagrammatic representation showing an alternative embodiment to the resilient member of the present invention;

FIG. 15 is a diagrammatic perspective view of the first embodiment of the present invention showing two panels positioned side by side;

Figure 17:
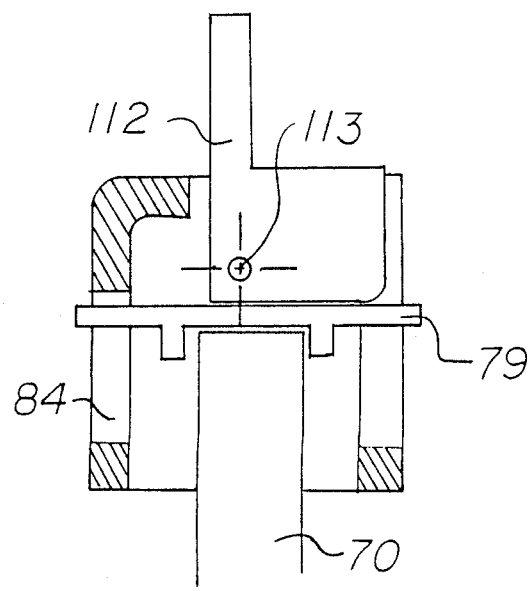
FIG. 17 is an illustration similar to FIG. 16 showing the lever in a second position whereby the resilient member is unrestrained.

DESCRIPTION OF THE VARIOUS EMBODIMENTS:

The basic fastening principle is shown in simplified form in FIGS. 3 and 4. It is intended to join first member 18 and second member 20 together with their respective facing surfaces 22, 24 flush together. A hole (or opening) 26 is provided in one of the surfaces. In the example shown, the hole 26 is in surface 22. In actual use, the choice of the surface into which the hole is made or formed will depend on the application. A bi-stable member 28 is disposed over the hole 26. Member 28 is of a planar, resiliently flexible material. In tested embodiments, vacuum-formable and sheet plastics were used; however, in large, heavy duty industrial applications metal, such as stainless steel or aluminum, could be employed. As illustrated in FIGS. 3 and 4, respectively, the member 28 is stable in an extended position and in a retracted position. It is free to move between a first stable position arched over the hole 26 as shown in FIG. 3 and a second stable position depressed into the hole as shown in FIG. 4. The outer surface 30 of the member 28 has one portion 32 of touch fastener material attached adjacent the center portion thereof. In its retracted position of FIG. 4, the one portion 32 of the touch fastener material is slightly below the facing surface 22 to be joined. The mating portion 34 of touch fastener material is attached to the facing surface 24 at the intended point of joining. Both portions 32, 34 can be conventional touch fastener materials attached by adhesive, or the like, in any usual manner. It is preferred that the hook portion of hook and loop type materials comprise the one portion 32 attached to the member 28 since there appears to be some additional gripping force created by the inward flexing of the hooks when moving to the retracted position; however the materials could be reversed, if desired, without significant adverse effect. In use, the two portions 32, 34 are positioned opposite one another, thus forcing the portions 32, 34 into engagement while simultaneously pushing on the bi-stable member 28, which ultimately causes member 28 to go over center and flip towards its second bi-stable state of FIG. 4 with the facing surfaces 22, 24 held flush together by the biasing force of the member 28 trying to pull into the hole 26 and assume its full second bi-stable position.

Turning now to FIGS. 5–8, the simplest embodiment of a bi-stable spring is shown. In FIGS. 5 and 6, the embodiment comprises a rectangular strip 52 of the resiliently flexible back material having the one portion 32 of the touch fastener material formed therewith or attached thereto at the center thereof. As will be appreciated by those skilled in the art, if the strip 52 is held in a foreshortened position as indicated by the dotted lines 54 in FIGS. 7 and 8, it will become bi-stable, as required for operation.

FIG. 9 shows one possibility for holding means to be used with the basic rectangular strip embodiment of FIGS. 9 and 10. In this instance, the holding means comprises a cup-shaped member 66 of plastic or metal. Member 66 has opposed recesses 68 adjacent the top edge for receiving the ends of the strip 52.

Bi-stable members carrying one part of a touch fastener could be formed as part of continuous molded material, e.g. each member may comprise, in part, a dome molded into a strip of touch fastener material. In a preferred arrangement the separating force of the touch fastener is greater than the force needed to move the bi-stable member from its second stable position to its first stable position.

In all of the embodiments discussed to this point, the chord of the curvative of the resilient member has a fixed length. The following embodiments provide means for increasing and decreasing chord length of that curvative to allow the member to easily move from a curved first stable position, to a substantially planar position, and then to a second curved stable position when desired. Adjustment of the chord length is useful in situations where the resilient member is not thin and flexible enough for it to be easily deformed and "popped" through from the first stable position to the second stable position without first increasing its chord length. Adjustable chord length resilient members are especially useful in firmly mounting large, heavy panels (e.g. aircraft interior panels) to support framework or the like.

Turning to FIG. 10, a curved resilient structure or member 28, preferably of rectangular cross-section, is supported by frame 72 and carries a first part 32 of a touch fastener, attached thereto by conventional means such as an adhesive on at least the center portion of the longitudinal length of the member. The center portion of the rear of the panel 70 has a second part 34 of a touch fastener attached thereto by conventional means so that when the touch fastener parts 32, 34 engage they fasten the panel 70 to the frame 72 by way of a biasing force provided by engagement of the touch fastener parts and the resilience of the curved resilient member 28 when in its first stable position as shown in FIG. 10. The touch fastener parts 32, 34 are preferably of the well known hook and loop separable fastener form.

The curved resilient member 28 is held captive at its lower end by projections 74 which locate the lower end of the curved resilient member 28 relative to the frame 72 while allowing pivoting movement of the lower portion as the curved resilient member 28 moves from its first stable position to its second stable position (as shown in FIG. 12). The upper end of the curved resilient member 28 is connected to an adjustable connecting mechanism 76, securely attached to the frame 72, which allows the upper portion of the curved resilient member 28 to pivot as the member 28 moves from its first to its second stable position while locating that upper portion relative to the mechanism 76. It will be appreciated that other means of locating the ends of member 28, such as pivotal connections to the frame and adjustable mechanism could be used and that the adjustable mechanism could be pivotably mounted to the frame while being itself securely attached to member 28.

When the curved resilient member 28 is in the position shown in FIG. 10, the components (28, 32, 34, 70, 72) are arranged such that the panel experiences a biasing force, generated by the resilience of the curved resilient member and the engagement of the touch fastener components, whereby the touch fastener components are under tension and the panel 70 is securely supported against frame 72.

As seen in FIG. 13, the adjustable connecting mechanism 76 further includes a locating bracket 79 carried in slots 84 provided in the sides of adjustable bracket support 77. The slots 84 allow confined up and down movement of the bracket 79 to provide means for adjusting the chord length 82 of the curved resilient member 28. The bracket 79 serves to locate the upper end of member 28 relative to the mechanism 76.

A cam 78 pivotable about pivot axis 80 fixed relative to frame 72, provides controlled adjustment of the chord length 82 of member 28. The cam 78 has a constant radius arcuate section R covering slightly less than 180 degrees, about the axis 80, except for a small flat section 102 which engages with the top of bracket 79 which acts as a cam follower held in resilient engagement with the cam by the resilience of the member 28 when the member 28 is in the restrained position (FIG. 10). This engagement prevents undesired rotation of the cam 78. The cam is connected to handle means 110 to provide for rotation of the cam 78 when desired.

If the cam 78 is rotated 180 degrees from the position shown in FIG. 10 and 13, a flat section 104 of the cam opposite the flat section 102 of the constant radius arc will engage with the bracket 79. The flat section 104 of the cam device 78 is located closest to pivot 80, the effect of the rotation is to increase the chord length 82 of the curved resilient member 28 and allow it to move the bracket 79 upward so that the curved resilient member 28 can lie substantially in the plane of the chord length 82 (FIG. 11). Further rotational movement of cam device 78 by 180 degrees decreases the chord length 82 to that of the first stable position and compresses the curved resilient member 28 back to its first stable position or into the second stable position shown in FIG. 12. In the second stable position, the panel 70 is positioned away from frame 72 so that access behind the panel 70 is readily achieved. Such access is useful, especially on airplanes and the like, where checking of the wiring, hydraulic connections, conduits, etc., behind the sidewall panels must be made on a periodic basis. In both positions, the panel is still held fast with the curved resilient member 28 by the engaged touch fastener parts 32, 34.

To ensure that the panel 70 does not accidentally become disconnected from the panel frame 72, locking means 86, such as pin means 87 projecting through both cam 78 and support bracket 77, can be provided to prevent any undesired rotation movement of cam 78. Since when locked the cam 78 cannot rotate in either direction, the chord length 82 of the curved resilient member 28 remains constant and the attachment of the panel 70 to the panel frame 72 is continuously ensured.

As will be apparent to those skilled in the art, the cam 78 can have other shapes as long as the cam allows appropriate adjustment of the chord length of the curved resilient member 28 so that it can be moved from its first stable position to its second stable position.

Figure 16:
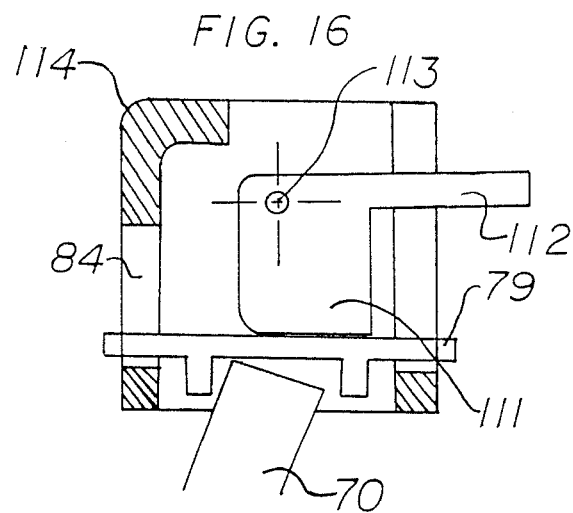
FIG. 16 is an illustration of a lever operated cam useful in adjusting the chord length of the resilient member when curved, the lever being shown in a first position restraining the curved resilient member.

The cam 78 depicted in FIGS. 10-12 is only one way of achieving adjustment of the chord length 82. Various other restraining means, such as pistons, levers, over-center latches and the like known in the art, can be employed as long as the restraining means restrains the curved resilient member in a first stable position, allows lengthening of the chord length to enable the curved resilient member to invert into a second stable position, and preferably allows locking of the curved resilient member in one or both stable positions. FIGS. 16 and 17 show an over-center cam 111 engaging with bracket 79 to provide adjustment for the chord length of panel 70. FIG. 16 shows the arrangement of the lever 112 in a restrained position while FIG. 17 shows the arrangement of the lever 112 in the unstrained position. The lever operated over-center cam 111 pivots about axis 113 which is fixed relative to support structure 114 mounted to frame 72. The amount of adjustment required is approximately equal to the arc length of the curved resilient member 28 when in its first or second stable position minus the chord length 82 of the curved resilient member 28. This chord length 82 is chosen to be short enough to provide desired constraint of the member in its first stable position until that chord length is increased.

Curved resilient members having adjustable chord lengths also work well for mounting flat panel members to framework and the like. In this application, a plurality of preferably smaller adjustable curved resilient members are utilized and spaced from one another about the framework, e.g. in each corner and around the perimeter as necessary, to ensure adequate flush-mounting of the panel 70 to the framework 72. The panel 70 carries a plurality of cooperating portions of the touch fastener positioned so as to engage with the plurality of curved resilient members.

In the embodiment shown in FIGS. 10-12, the touch fastener 32 is only applied to the center portion of the curved resilient member 28. It is possible to dispose the touch fastener 32 along the entire longitudinal length of the curved resilient member 28 so that it can engage with a mating portion of the touch fastener 34 disposed substantially along the entire associated area of the panel 70, and this can be seen in FIG. 15. In this arrangement, the top and bottom sections of the touch fastener parts 32, 34 gradually peel out of engagement with one another, as the chord length increases, and become disengaged from one another, except for the middle section of the touch fasteners, as the curved resilient member is moved into the second stable position.

In FIG. 15, it can be seen that two or more restraining means can be interconnected with one another by shaft 100. This interconnection simplifies the locking and unlocking of the restraining means of a plurality of members 28 used to mount a panel (or a plurality of panels 70) which can be readily unlocked and disengaged from frame 72 by turning the single shaft 100 after the unlocking locking means connected to the shaft cams 78. This arrangement would be especially useful on airplanes and the like where a plurality of panels are aligned in a row along the sidewall of the airplane.

The embodiments discussed to this point relate to the use of a resilient unitary bi-stable member in combination with touch fastener components. It is equally possible that the bi-stable member could consist of at least two rigid members 90, 94, as shown in FIG. 14, which are connected to one another by pivot means 92. The pivot means 92, in turn, being attached to the panel 70 by means of touch fastener parts 32, 34. The opposite end of member 90 is pivotally connected to frame 72 by pivot 91. The opposite end of member 94 is connected to mechanism 76 by pivot 93. This arrangement works substantially as discribed above whereby when the chord length 82 of the mechanical members 90, 94 is increased sufficiently, the two mechanical members 90, 94 can lie in the plane of the chord length 82 and then be inverted into a second stable position by decreasing the chord length 82 back to that of the first stable position. However, since the mechanical combination is not resilient, tension spring 98 associated with the adjustable mechanism 76, extending from frame 72 to pivot 93, is provided to exert force longitudinally of the members so that the mechanical members are biased to lie in the chord plane. Other arrangements using compression spring biasing to the first and second stable positions or positive pin in grove camming are apparent alternatives.

The present invention is also useful in the automotive industry for fastening panels (e.g. trim panels), wherein each surface carries mushroom heads or the like material touch fasteners on their engaging surfaces. For this application, the curved resilient member is first placed in its second stable position, i.e. projecting outwardly away from the supporting frame, so that as the panel initially engages the curved resilient member the panel is still spaced from the frame. Due to the outward curvature of member 28, the touch fastener elements have a greater space therebetween thereby facilitating easier engagement of the touch fastener parts. Thereafter, when force is applied to the panel, perpendicular to the chord length of the curved resilient member, the mushroom heads engage one another and substantially force the curved resilient member into its second stable position so that the panel is held fast with the frame with the mushroom heads tightly and captively engaged to each other by the now inverted curvature of the member 28.

Thus it can be seen that in various embodiments as described hereinbefore, the present invention has achieved its desired object by providing a means for employing touch fastener material to achieve a true flush mounting of two surfaces together.

Wherefore, having thus described my invention, I claim:

1. A fastener system for mounting a structure to a support by means of a fastener having a first part, associated with said structure, carrying a large plurality of projecting elements capable of engaging cooperating elements carried by a second part of the fastener, associated with said support, to fasten the structure and support together, comprising:
    (a) a resilient member having one of the first and second parts of the fastener attached to a surface thereof at least adjacent a center portion thereof;
    (b) restraining means, connected to said support, defining the length of a chord of a curvature of said member to form a curved resilient spring able to move from a first stable arched position to a second stable inverted arched position, the elements of said first part, when engaging with the elements of said second part, resiliently fastening said structure and support together by means of a force provided by the engagement of the elements of the fastener parts and the resilience of the resilient members; and
    (c) adjustable means associated with said restraining means for adjusting the chord length of said curved resilient spring, when desired, to facilitate movement from one to the other of the two stable positions.

2. A fastener system according to claim 1 wherein the projecting elements of said first and second parts are able to engage one another and comprise one of hooks, loops, mushrooms, balls on stems, pigtails and the like.

3. A fastener system according to claim 2 wherein said first part is disposed on at least the center portion of a longitudinal length of said structure and said second part is disposed on at least the center portion of said support structure and positioned so that the first and second parts can engage to fasten the structure to the support.

4. A fastener system according to claim 1 wherein said adjusting means comprises cam means and movement of said cam means from a first position to a second position increases said chord length to facilitate movement of said curved resilient spring from one to the other of said two stable positions.

5. A fastener system according to claim 3 wherein said first part is disposed substantially along the entire longitudinal length of said curved resilient spring.

6. A fastener system for flush-mounting a first surface to a second surface by means of a fastener having a first part carrying a large plurality of projecting elements capable of engaging cooperating elements carried by a second part of the fastener to fasten the surfaces together, comprising;
    (a) a resilient member having one part of the fastener attached to a surface thereof at least adjacent a center portion thereof;
    (b) restraining means, connected to said second surface, defining the length of a chord of a curvature of said member to form a curved resilient spring able to move from a first stable arched position to a second stable inverted arched position in which the elements of said one part of the fastener are below one of the surfaces whereby in said second stable position the elements, when engaged with the elements of the other part of the fastener attached to the other of said surfaces, resiliently maintain said first and second surfaces flush with one another under a biasing force provided by the engagement of fastener parts and the resilience of the resilient member; and
    (c) adjustable means associated with said restraining means for adjusting the chord length of said curved resilient spring, when desired, to facilitate movement from one to the other of the two stable positions.

7. A fastener system according to claim 6 wherein the projecting elements of said first and second parts are able to engage one another and comprise one of hooks, loops, mushrooms, balls on stems, pigtails and the like.

8. A fastener system according to claim 7 wherein said first part is disposed on at least the center portion of a longitudinal length of said first surface and said second part is disposed on at least the center portion of said second surface so that the first and second parts can engage to fasten the first and second surfaces together.

9. A fastener system according to claim 6 wherein said adjusting means comprises cam means and movement of said cam means from a first position to a second position increases said chord length to facilitate movement of said curved resilient spring from one to the other of said two stable positions.

10. A fastener system according to claim 8 wherein said first part is disposed substantially along the entire longitudinal length of said curved resilient spring.

11. A fastener system for flush-mounting a first surface to a second surface by means of a fastener having a first part, associated with one of the surface, carrying a large plurality of projecting elements capable of engaging cooperating elements carried by a second part of the fastener, associated with the other of said surfaces, to fasten the two surfaces together, comprising;
    (a) a resilient member having one part of the fastener attached to a surface thereof at least adjacent a center portion thereof;
    (b) restraining means, connected to said second surface, defining the length of a chord of a curvature of said member to form a curved resilient spring able to move from a first stable arched position to a second stable inverted arched position,
    said member being disposed relative to said second surface with said one part of the fastener being within said second surface when said member is in said first stable position and with said one part of the fastener being outside said second surface when said member is in said second stable position whereby in said first stable position the elements of said one part, when engaged with the elements of the other part, resiliently fasten said first and second surfaces flush with one another under a biasing force provided by the engagement of fastener parts and the resilience of the resilient member; and
    (c) adjustable means associated with said restraining means for adjusting the chord length of said curved resilient spring, when desired, to facilitate movement from one to the other of the two stable positions.

12. A fastener system according to claim 11 wherein the projecting elements of said first and second parts are able to engage one another and comprise one of hooks, loops, mushrooms, balls on stems, pigtails and the like.

13. A fastener system according to claim 12 wherein said first part is disposed on at least the center portion of a longitudinal length of said first surface and said second part is disposed on at least the center portion of said second surface so that the first and second parts can engage to fasten the first and second surfaces together.

14. A fastener system according to claim 11 wherein said adjusting means comprises cam means and movement of said cam means from a first position to a second position increases said chord length to facilitate movement of said resilient spring from one to the other of said two stable positions.

15. A fastener system according to claim 13 wherein said first part is disposed substantially along the entire longitudinal length of said curved resilient spring.

16. A fastener system for mounting a structure to a support by means of a fastener having a first part, associated with said structure, carrying a large plurality of projecting elements capable of engaging cooperating elements carried by a second part of the fastener, associated with said support, to fasten the structure and support together, comprising:
    (a) a resilient member having one of the first and second parts of the fastener attached to a surface thereof at least adjacent a center portion thereof;
    said resilient member comprising at least two mechanical members, the mechanical members being serially interconnected by a pivot means having the first part disposed on a surface facing said structure, each opposite end of said mechanical members being pivotably secured to said support;
    (b) restraining means, connected to said support, defining the length of a chord of a curvature of said resilient member, said mechanical members being biased out of alignment by said restraining means to form a resilient spring able to move from a first stable angled position to a second inverted stable angled position;
    said restraining means further comprising a spring means biasing said mechanical members to form said resilient spring;
    the elements of said first part, when engaging with the elements of said second part, resiliently fastening said structure and support together by means of a force provided by the engagement of the elements of the fastener parts and the resilience of the resilient members; and
    (c) adjustable means associated with said restraining means for adjusting the chord length of said curved resilient spring, when desired, to facilitate movement from one to the other of said two stable positions.

* * * * *